(No Model.)  4 Sheets—Sheet 1.

R. GORNALL.
MACHINE FOR TESTING CANS.

No. 246,754. Patented Sept. 6, 1881.

Attest:
R. F. Barnes
[signature]

Inventor:
Richard Gornall
by Ellis Spear
Attorney (No Model.)

R. GORNALL.

MACHINE FOR TESTING CANS.

No. 246,754. Patented Sept. 6, 1881.

Attest:
R. F. Barnes
S. W. Lusby

Inventor:
Richard Gornall
Ellis Spear
Attorney (No Model.)  4 Sheets—Sheet 3.

R. GORNALL.
MACHINE FOR TESTING CANS.

No. 246,754.  Patented Sept. 6, 1881.

Attest:
R. F. Barney
L. W. Sully

Inventor:
Richard Gornall
by Ellis Spear
Attorney (No Model.)  4 Sheets—Sheet 4.

R. GORNALL.
MACHINE FOR TESTING CANS.

No. 246,754.  Patented Sept. 6, 1881.

Attest:
R. F. Barnes
S. W. Luly

Inventor:
Richard Gornall
by Ellis Spear
Attorney

UNITED STATES PATENT OFFICE.

RICHARD GORNALL, OF BALTIMORE, MARYLAND.

MACHINE FOR TESTING CANS.

SPECIFICATION forming part of Letters Patent No. 246,754, dated September 6, 1881.

Application filed February 9, 1881. (No model.)

*To all whom it may concern:*

Be it known that I, RICHARD GORNALL, of Baltimore, in the county of Baltimore and State of Maryland, have invented a new and useful Improvement in Machines for Testing Cans; and I do hereby declare that the following is a full, clear, and exact description of the same.

My invention relates to machinery for testing cans of that class which are required to be sealed air-tight.

In the manufacture of that class of cans it has heretofore been customary to ship the cans to the packers without inspection, or without very close inspection, for the purpose of ascertaining the existence of any defects or leaks. These leaks, whether owing to imperfection in the sheet metal or, as is more commonly the case, to defective soldering, are not easily discovered by mere inspection of the cans, since the defects named are not often apparent to the eye. Great loss to the can-makers arises from these defects, which are not discovered until the cans have been filled by the packers, and the cans, when found to be thus defective, are returned with their contents to the can-makers. It is impracticable to submit the cans to any ordinary inspection, such as might be applied by a workman testing each can separately and by manual labor, by reason of the expense of such an operation, which would add too much to the original cost of the cans.

To remedy this evil and to test the cans by machinery rapidly and cheaply is the object of my invention, the general principle of which consists in causing the air charged into each can to control the directing-chute or other delivering mechanism, whereby the retention of the air in a tight can will retain the delivery or directing mechanism in one position, and the escape of air from a leaky can will cause the said mechanism to turn in another direction.

The accompanying drawings represent the apparatus in which I have embodied my invention.

Figure 1:
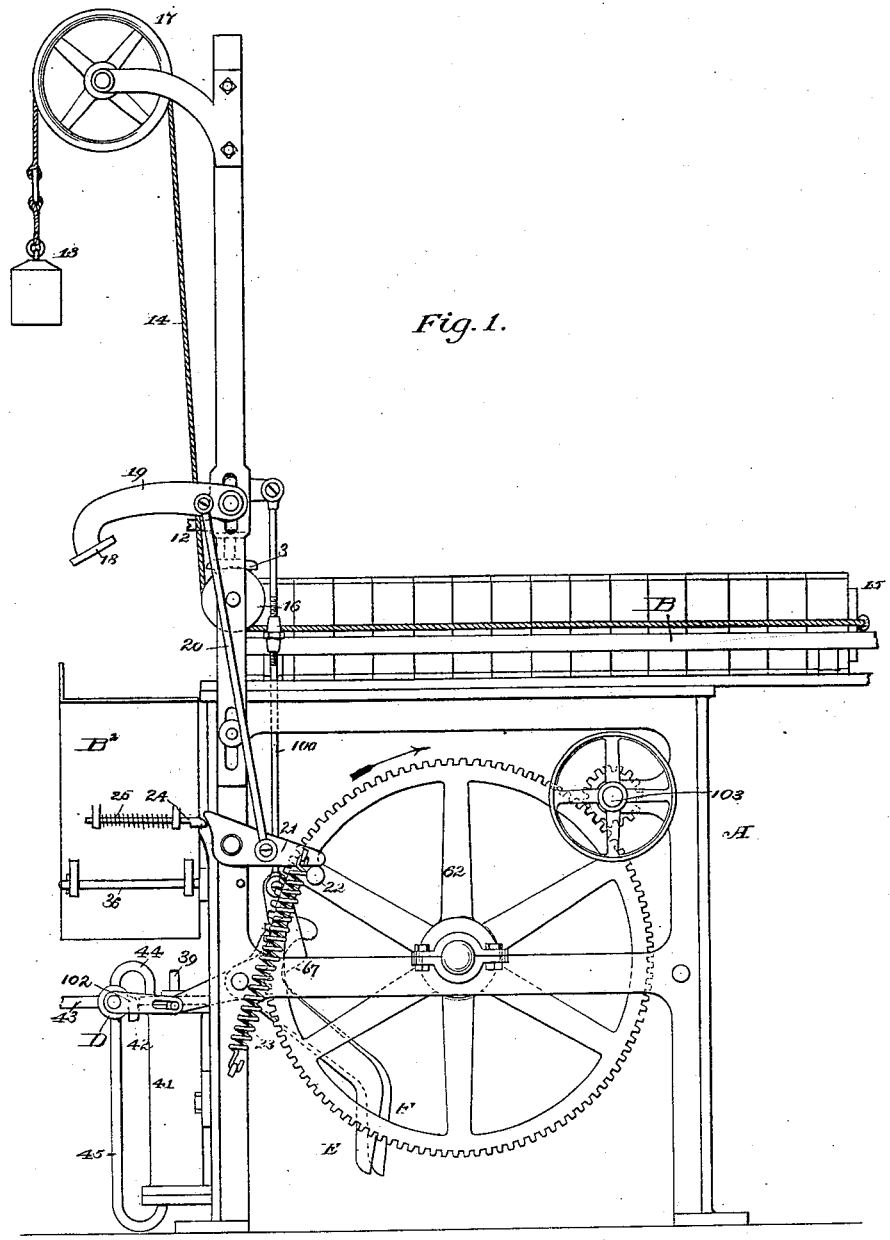
Figure 2:
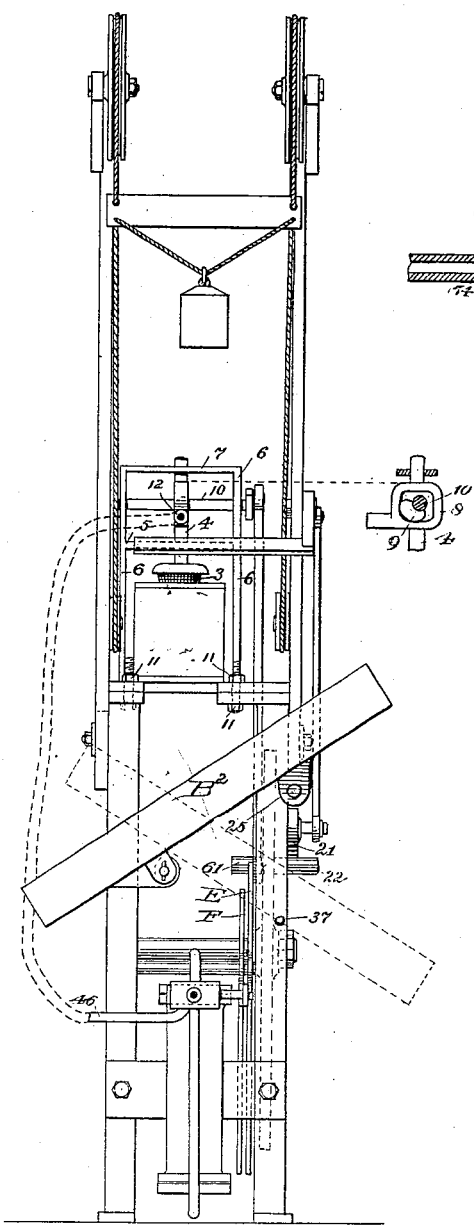
Figure 3:
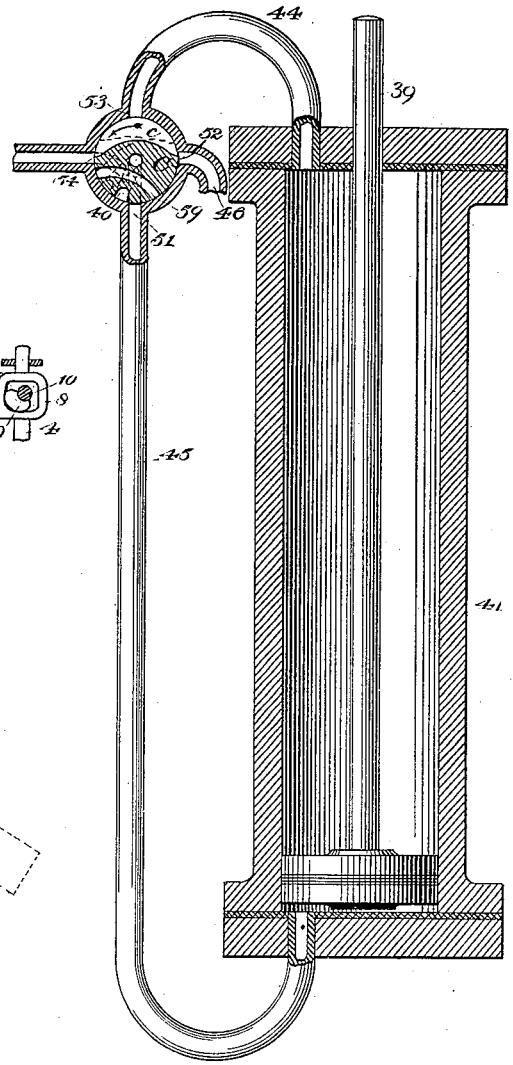
Figure 4:
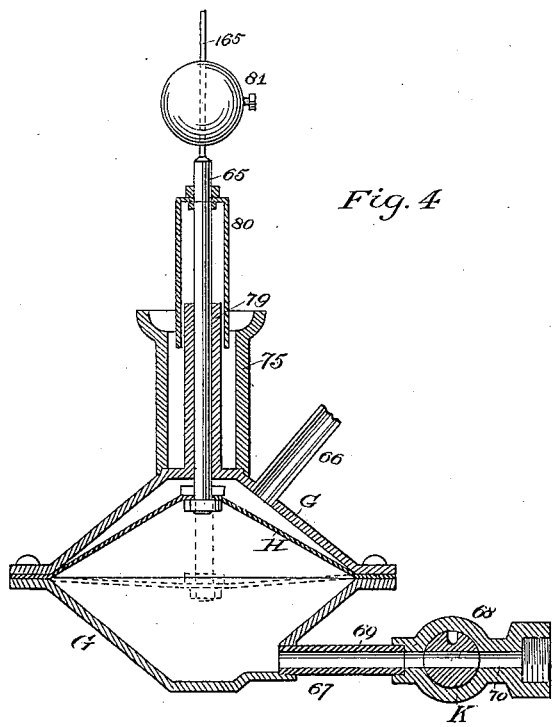
Figure 5:
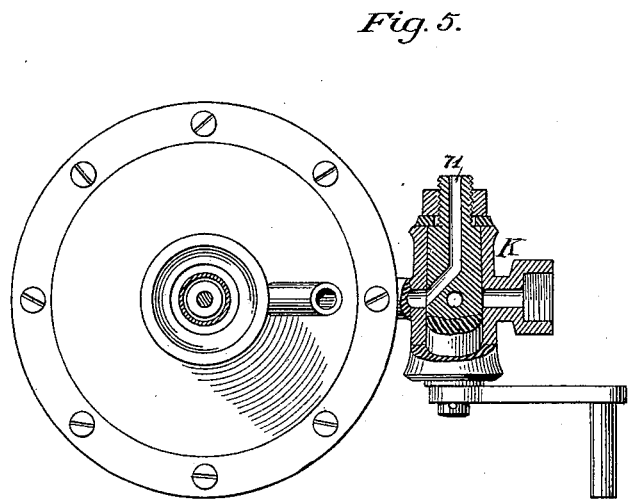

In these drawings, Figure 1 represents a side, and Fig. 2 an end, elevation. Fig. 3 shows a section of the air-cylinder and connections; Fig. 4, a section of a modification thereof; Fig. 5, a plan view of Fig. 4 and section of its valves; and Fig. 6, a rear view of the main gear-wheel and the cam-levers, showing in dotted line the extent of movement of such levers.

In these drawings, A represents a table, upon the supporting frame-work of which the driving mechanism is mounted. Upon this table is fixed a chute or way, B. The sides of this chute are made adjustable by means of slots, in which the posts are set, so that the sides may be moved in or out in order to adapt the width of the chute to the size of the cans to be tested. These cans are fed forward, by means hereinafter described, to the end where the testing mechanisms are located. They are moved intermittently, the amount of each movement being equal to the diameter of the can. At the end toward which the cans are moved is mounted centrally over the chute an elastic pad adapted to fit over the opening in the can left for the cap. This pad (marked 3) is attached to a metal disk fixed to a stem, 4, which passes through the cross-bar 5, held on posts 6 6. The upper part of the stem passes through an upper guiding cross-bar, 7, and between the two cross-bars is a yoke, 8, (detached part, Fig. 2,) in which plays a cam, 9, on a shaft, 10, said cam being adapted, when the shaft is turned, to depress the pad upon the can or to lift it quite clear therefrom. The posts 6 6 are adjustable in height by means of nuts 11 11 above and below the ears on the chute-bottom, through which the posts pass. This adjustability in the posts is to vary the height of the pad according to the size of the can to be tested. The stem, pad, and cap are perforated longitudinally, the perforation thereof communicating with the tubular branch 12, fixed to the stem, and fitted at its outer end for connection with a pipe of rubber or any suitable material.

The construction described is such that when the pad is down upon the can (it being understood that the cans are set with the open end upward) a current of air may be forced through the pipe to the interior of the can, the pad being of rubber or some equivalent material, and larger than the opening in the top of the can, to prevent the escape of air between the bottom of said pad and the can-top.

The cans are moved forward to the end of the chute, where they are tested by means of a weight, 13, which acts against the rear of the column of cans on the chute through cords 14 and a cross-bar, 15. The cords run over pulleys 16 and 17 to the cross-bar, and the pressure against the column of cans is constant. A gate, 18, is mounted on arm 19 and hinged to swing vertically across the forward end of the chute, and when this gate is down the cans are arrested. This gate is moved and held in place by means of a rod, 20, which is pivoted upon the arm 19 at one end and at the other to a pivoted trip-lever, 21. The trip-lever is pivoted on the frame, and the longer end projects into the path of a pin, 22, on the front of the wheel 62. It is held down by a spring, 23, the force of which must be sufficient to overcome that of the weight 13 when permitted to act against it, and to hold, when this gate is down, the column of cans in position. The gate is lifted by the pin 22 striking against the trip-lever and raising it, thereby pushing the gate up sufficiently far to allow the forward can, after testing, to fall out over the end of the chute. The can, when under the pad, should stand near the end of the chute, at a distance from the end less than one-half the thickness or diameter of the can.

The action of the pad in its connection with the air-regulating apparatus is hereinafter explained; but, in respect to the gate, it should be understood that the pad is pressed down upon the can during the operation of testing, and while down holds the can securely in place, and thus arrests the whole column. It is lifted in order to allow the column of cans to advance far enough to bring into place the next can to be tested, and the movement of the column presses the can last tested against the face of the gate, which must be distant from the edge of the can under the pad the exact diameter of a can. As soon as the cans are thus pushed forward, so that the tested can bears against the gate, the pad is made to descend again and bear upon the can immediately thereunder. This holds the column, and then, or shortly thereafter, the pin should strike the trip-lever and raise the gate. The can bearing against the gate, having its center of gravity beyond the end of the chute, falls into the directing-chute B² and is discharged.

The manner of operating the delivery-chute for discharging and separating perfect and imperfect cans will be hereinafter described. The tripping mechanism, however, has been referred to in connection with the gate.

On the bottom of the delivery-chute is a catch, 24, which is held by a spring, 25, in contact with a rest on the main frame and in the path of the trip-lever 21. As the latter reaches the end of its movement its outer end bears on the catch, releases it from the rest, and the chute drops into position for delivering perfect cans. When the chute is released, by mechanism to be described, the catch 24 engages automatically with its rest, holding the chute in position for delivering an imperfect can. When a new supply of cans is required the attendant lifts the cross-bar 15, and, drawing it back, places it over the new supply of cans in the chute.

I proceed next to describe the mechanism for forcing the air into the cans and for automatically operating the chute, which turns defective cans to one side and perfect cans to the other.

The chute is eccentrically pivoted on the horizontal rod 36, the long end being toward the front of the machine, or to that side to which the perfect cans are to be directed. Its own weight holds it inclined to the front, resting upon a pin, 37. The catch 24, when the said chute is raised, holds it inclined in the opposite direction. The chute is raised by means of a piston-rod, 39, which rises vertically in range of the inner edge of the chute. The piston-rod is connected to a piston working through a stuffing-box in a cylinder, 41, fixed vertically to the frame of the table. It has a special arrangement of connecting-pipes and a special construction of four-way cock. (Shown in detail in Fig. 3.) The general construction of this part of the apparatus is such that when the compressed air is admitted to the upper part of the cylinder above the piston that part is in atmospheric connection with the interior of the can, which is then in place and subjected to the pressure of the pad; but the air is not in the first instance introduced beneath the piston. As a matter of course, the piston is then down. The air being introduced under pressure, that pressure is above the piston, and also by means of connecting-pipes charged equally into the can. Immediately succeeding the act of filling the can and the cylinder above the piston with compressed air, the cock is so turned as to shut off the air and leave it confined in the can and the upper part of the cylinder, and at the same time is directed beneath the piston with exactly the same tension; but obviously if there remained the same tension of air in the cylinder above and below the piston, said piston will be in equilibrium of pressure as respects the air, and will be held down by its own weight; but if there be any leak in the can, the air escaping therefrom will relieve the pressure in the cylinder above the piston and a greater pressure of air below will force the piston-rod up, lift the chute until the catch 24 has engaged with its rest, and it is held in a position inclined to the rear. Then the can the leak in which caused the escape of air, and which is thereby detected as defective, is ejected from the chute and is discharged from the rear. At the same time the end of the tripping-lever heretofore described strikes the catch, pushing it off, and causing it to incline to the front, and the succeeding can is in the meantime brought into place to be tested.

The special mechanism by which the operations above described are accomplished is shown in Fig. 1 and in the detail views. The air-cylinder is shown at 41, Fig. 1, attached to a cross-bar on the frame of the table. Its piston-rod 39 rises, as before described, in range with the chute, and far enough to reverse the position of the chute and to cause it to incline to the rear. A short pipe, 43, couples with the pipe leading to the air-compressor, and through the four-way cock D it connects by pipe 44 to the upper part of the air-cylinder, and by pipe 45 to the lower part of the same. It also connects with a pipe, 46, Fig. 2, through the same cock. The pipe 46 is connected by a flexible pipe, or in any other convenient way, with the tubular branch 12, fixed to the stem of the rubber pad which presses on the can. A flexible pipe of india-rubber is better for this connection, as it easily allows the required movement of the pad.

The plan of the four-way cock is shown in Fig. 3. The opening 51 in the case of the cock leads through the short pipe to the bottom of the cylinder. Port 52 leads into the short pipe which communicates with the interior of the can. Port 53 leads to the top of the cylinder above the piston, and 54 leads to the supply.

The valve portion of the cock has a perforation, 40, which communicates with an axial perforation adapted to discharge through the rear of the case to the outside. The valve is also perforated, as shown in curved lines at 59, so that there may be communication between the supply-port 54 and the bottom port, 51, when required. The pressure of air from the supply is constant and uniform.

Figure 6:
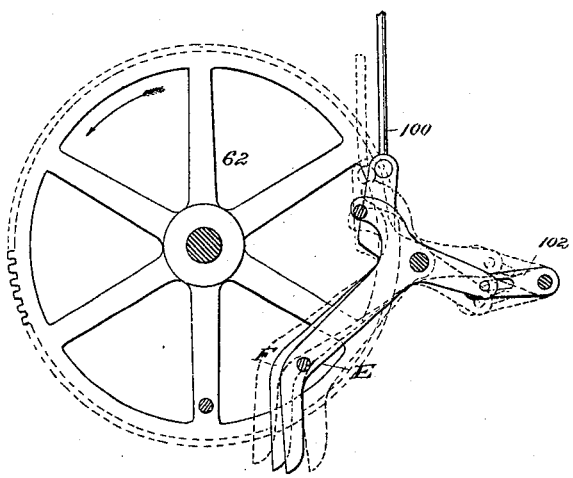

The stem of the valve is moved by a cam-lever, E, the short end of which carries a pin, which works in the slot of a short lever, 102, fixed on the end of said stem. The lever E is approximately of S form, as shown in Fig. 6. It is pivoted on a transverse rod in the frame, and the lower and longer end projects into the path of a pin, 61, on the wheel 62, which meshes into and is driven by a pinion on the main driving-shaft 103. This wheel operates all the valve-connections necessary to put the can under the required atmospheric pressure, which operation is accomplished once in each revolution by the pin 61, and the wheel is made of a size sufficient to allow the air to act upon the lifting piston-rod of the cylinder after the pin 61 has operated on the cock and other mechanism working therewith and before it comes around again to repeat the operation.

To describe the operation of the cock it is assumed that the pin 61 has just passed the cam-lever E and completed the movement which it is adapted to give to said lever. By means of another similar cam-lever, F, pivoted by the side of E and on the same rod, and connected to the arm of cam 9 by rod 100, it has pressed down the pad 3, closed the can thereunder from the external air, and thrown it into connection with the air-passage heretofore described. The last movement of the pin 61 upon the lever E (the pin moving in the direction of the arrow in Fig. 1) has also been to turn the cock so as to bring the cutaway or low part of the valve to register with ports 52 and 53—that is to say, to bring the top of the piston and the interior of the can into communication with each other. It will be understood that they have previously been filled or charged with compressed air; but the order of movement of parts for such charging are hereinafter more fully set forth. At the same time the can and top of the cylinder are cut off from the supply, and the air in said top and can and intermediate connections is quite inclosed unless there be a leak in the can itself. Also, at the same time the supply at port 54 is in communication with the port 51, leading to the bottom of cylinder, through the hole 59, drilled in the valve, out of line with that leading to the axial or outside port.

It will be borne in mind that the cock and passages are all in the described position at the instant the pin has left the levers and during its entire revolution with the wheel 62 until it comes again into contact with the other or lower end of said levers. It should also be understood that at the commencement of the operation by the filling of the upper part of the cylinder while the cock is in slightly different position, as hereinafter described, the piston has been depressed. During the revolution of the pin 61, therefore, the position of the piston and its rod will depend upon the retention of the air in the upper part of the cylinder. The cylinder and connection being, of course, air-tight, if there be no leak in the can, the piston will be under the same pressure on both sides and will remain down, and the chute B will also remain inclined to the front, so that the can, when released from the pad and pushed off, will fall to the front. If, however, the can happens to be leaky, the air therein will escape therefrom and relieve the pressure in the upper part of the cylinder, destroying the equilibrium of pressure upon the piston. The constant pressure from the air-supply, being on the lower side of the piston, will expel the air from the upper end and lift the piston and its rod, and thereby the longer end of the chute B, until its catch has engaged with its rest, as before described, when the said chute will be held in reversed position, inclined to the rear. This can, when discharged from the tester, will therefore fall to the rear, apart from the perfect cans. At the same time the tripping mechanism, advancing after the can is pushed off, trips the catch of the chute B, as before described, and, releasing it, allows it to drop to the front; but before this latter part of the operation is effected certain other operations must be performed. First the pad must be lifted, and next the air must be cut off from the pipe which leads to the can, so as not to waste the supply of compressed air; and, third, the air must be supplied to the uppert part of the cylinder again and let off from the lower, in order that the piston and rod may fall.

The lifting of the pad and the shutting off of the air from the can are effected practically at the same instant by the pin 61 striking the lower ends of the cam-levers E F. As the lever F is pushed back it draws down the rod 100 attached to its upper end, and thereby rocks the shaft 10 of the cam and lifts the pad. The cam is of such shape and so arranged in the yoke that when down it remains locked, but is raised and lifts the pad by a slight motion of the cam-shaft. (The rod 100 is extensible for adjustment to different sizes of cans.) At the same time that the pin 61 pushes back the lever F it also moves the lever E, lifting the lever 102 on the stem of the valve of the cock and moving said valve to the left (or in the direction of the arrow in Fig. 3) sufficiently to cause the full face of the valve-disk to close the port 52. Further movement of the lever E and valve causes the full face on the opposite side to pass the port 54 and put it, by means of the depressed face C, in communication with port 53, and throws thereby the supply of compressed air into the top of the cylinder, but not into the can. This same movement has also brought the passage 40 in the valve, which is in connection with the axial or exhaust-port, to register with the port 51, leading to bottom of the cylinder, whereby the air is exhausted from the bottom and the piston permitted to descend. At this time, as will appear from Fig. 3, all the other ports are closed. This is the extreme limit of movement of the valve, and is effected by the passage of the pin 61 over the lower part of the lever E. Reverse movement, caused by the passage of the pin 61 over the upper or hooked part of the lever E, first cuts off the exhaust from the bottom by moving perforation 40 out of registry with port 51. It next opens port 52 and permits the air to pass to the can, (which has been closed by the striking of the pin 61 against the steep shoulder 67 on the lever F and bringing down the pad.) As port 52 is opened by the passage of the high part of the valve, (in direction opposite arrow in Fig. 3,) the low part leaves for an instant ports 54, 53, and 52 all open or partially open and in connection. The supply of air to the top has been effected previously to the opening of 52; but further movement in the direction last indicated closes port 54 and shuts off the supply.

The interval between the opening of 52 and the closing of port 54 must be enough to allow the can to be charged, and no more. The movement of the cock mechanism to supply air to the can must be timed accurately, and must follow directly the movement of the lever F, which shuts down the pad. The shutting off of the air from the top of the cylinder and from the can puts the supply through the passage 59 into connection with port 51 to bottom of piston. This brings the parts into the position assumed at the beginning of this description of the operation of the cock and connecting parts.

It will be borne in mind that the weight presses upon the column of cans constantly, and that the movement of the cans forward to the testing-point is regulated by the rise and fall of the pad. As soon as a can reaches its place under the pad the pad descends and the air enters the can, and is there retained while the testing process is going on. The operation of testing must be completed and the pad lifted and air shut off from the pipe leading up to the can before another comes in contact with the tested can to push it from its seat.

The above-described apparatus for raising the directing-chute is appropriate, and is mainly intended for testing round cans. For testing square cans, such as are ordinarily used in canning raw oysters, the force of air required to raise the directing-chute by means of a piston-rod passing through an ordinary stuffing-box would be so great as to cause the cans to bulge, and thus injure them commercially. To adapt the machine to the testing of these square cans, I use a modified form of the mechanism for lifting the directing-chute, such as I have shown in Figs. 4 and 5. Instead of a piston working in a cylinder, I use in this form a diaphragm in an air-tight case, such as those used in gas-regulators. The case is represented at G G', being composed of two parts of cup shape, each provided with a flange by which the cups may be bolted together. When so bolted the two flanges include a loose or flexible diaphragm, H, dividing the case into two air-tight compartments. The diaphragm is provided with a central rod, 65, which performs the functions of the piston-rod 39 in the form described above. The upper chamber of the case communicates with the can, in the manner before explained, through a pipe, 66. Air from the supply is forced into the lower chamber through the pipe 67. Its flow is regulated by a cock, K, the crank-pin of which is worked by the short arm of the lever E, in the same manner as that of the four-way cock heretofore described. The cock has an opening, 68, which, when registering with 69 and 70, admits air to the lower chamber, below the diaphragm, Fig. 4. An exhaust-opening, 71, registers with the port 69 by a quarter-turn from 68.

This apparatus is intended to be operated by a very slight pressure of air—say a few ounces to the square inch—and in any event not enough to cause the cans to bulge. Pressure so slight would not work the piston-rod if an ordinary stuffing-box were used. I have therefore provided a packing of quicksilver or water for the piston. This is shown in Fig. 4, in which 75 shows an outer section of tube screwed to a boss on the upper case, and adapted preferably to hold quicksilver. An inner tube, 79, permits the passage of the piston-rod, which is held to the diaphragm by small washers. To the rod is attached a tube, 80, closed at the upper end and fitted to play in the annular space between tubes 78 and 79. This space being filled with quicksilver or any suitable liquid up to a point above the highest limit of motion of the lower end of the tube 80, the escape of air from the upper chamber through the tube 79 is entirely prevented and free motion of the rod permitted. A small weight, 81, (or a spring may be used,) is placed on the top of the rod 165 to return it when when the exhaust-port 71 is opened. The directing-chute is set in the same manner for this device, and its operation is the same as that before described; but the chute may be more nicely balanced, in order that it may be operated by less force. The admission of the air below the diaphragm tends to raise it and the piston-rod; but if the can be tight escape of air from the chamber above the diaphragm is prevented, the piston cannot rise, and the chute remains inclined to the front. Escape of air permits it to rise with the same effect as that produced by the piston of the cylinder.

It is necessary that the sides of the chute on which the cans are moved and supported in order to be tested should fit accurately to the cans, and that each movement should be accurately adjusted, so that each can may be left centrally under the pad.

All the feeding mechanism and the mechanism for opening the cock may be greatly varied without departing from the essential principle of my invention. It is plain, also, that the apparatus for testing without alteration may be used without the devices for pushing forward the line of cans, since the cans may be placed by an attendant, one by one, upon the tester under the pad at exactly the instant to receive the pressure. This would require more careful and skillful attention; but with the chute which I have shown the attendant has only to place the cans therein and to take care only that they are placed with the open end upward, and that the chute is kept supplied. In any case there must be a seat for the cans corresponding to the end of the horizontal or inclined chute where the pad is located, a pad or some equivalent valve arrangement by which the can may be closed to the external air, and a piston and cylinder in communication with an air-supply and with the can under some arrangement the equivalent of that described, so that the escape of air from the can shall permit the action of the air at its normal tension to throw up the delivery-chute and turn aside the defective can, the same mechanism remaining inactive if the can do not permit any escape.

The delivery-chute may obviously be varied in form and arrangement, or used in the modified form of a trap, all that is essential being that it shall be capable, when operated by the piston, of turning the perfect cans in one direction and the imperfect in another.

Having thus described my invention, what I claim is—

1. A can-testing machine having mechanism for charging cans successively with compressed air, a directing-chute, a piston moved by compressed air in connection with that charged into the can, and valve mechanism for controlling the air, whereby the escape of air from the can changes the direction of the chute, as set forth.

2. A machine for testing cans, consisting of a seat for the can, an air-cylinder, piston, and rod for operating a directing-chute, air-connections between cylinder and can, and valve mechanisms, substantially as described, whereby the can is charged and escape of air therefrom changes the direction of the chute, substantially as set forth.

3. The combination of a chute for holding the cans, a pad, and air-connections with the cylinder, and devices for operating the pad, and feed mechanism for moving forward the cans, all operating in connection with a directing-chute, substantially as described.

4. The cylinder and piston adapted to operate in connection with the directing-chute of the can-testing machine, in combination with pipes leading to upper and lower ends, supply-pipe, and pipe leading to the pad, and with the described cock and mechanisms for operating the same in connection with the pad, substantially as described.

5. In a device for testing cans, the cam-lever E, in combination with the valve mechanism and the wheel 62, substantially as described.

6. The cam-lever F, operated by pin on wheel 62, in combination with the cam 9, connecting-rod, and pad, substantially as described.

7. The automatic feeding mechanism, consisting of the end cross-bar and weight, operating, in connection with the pad, gate, and tripping mechanism, substantially as described.

8. The gate 18, in combination with the chute for holding the cans, the rod 20, and pivoted lever 21, and pin on wheel 62, substantially as described.

9. The combination of the directing-chute B, pivoted as described, with its spring-catch and the tripping-lever, all operating in the described apparatus, as set forth.

In testimony whereof I have signed my name to this specification in the presence of two subscribing witnesses.

RICHARD GORNALL.

Witnesses:
CHAS. P. FELDHAUS,
JOHN KRUZER.